July 21, 1931. E. L. BARTELS 1,815,042
STRAW SPREADER
Filed Nov. 24, 1928 2 Sheets-Sheet 2
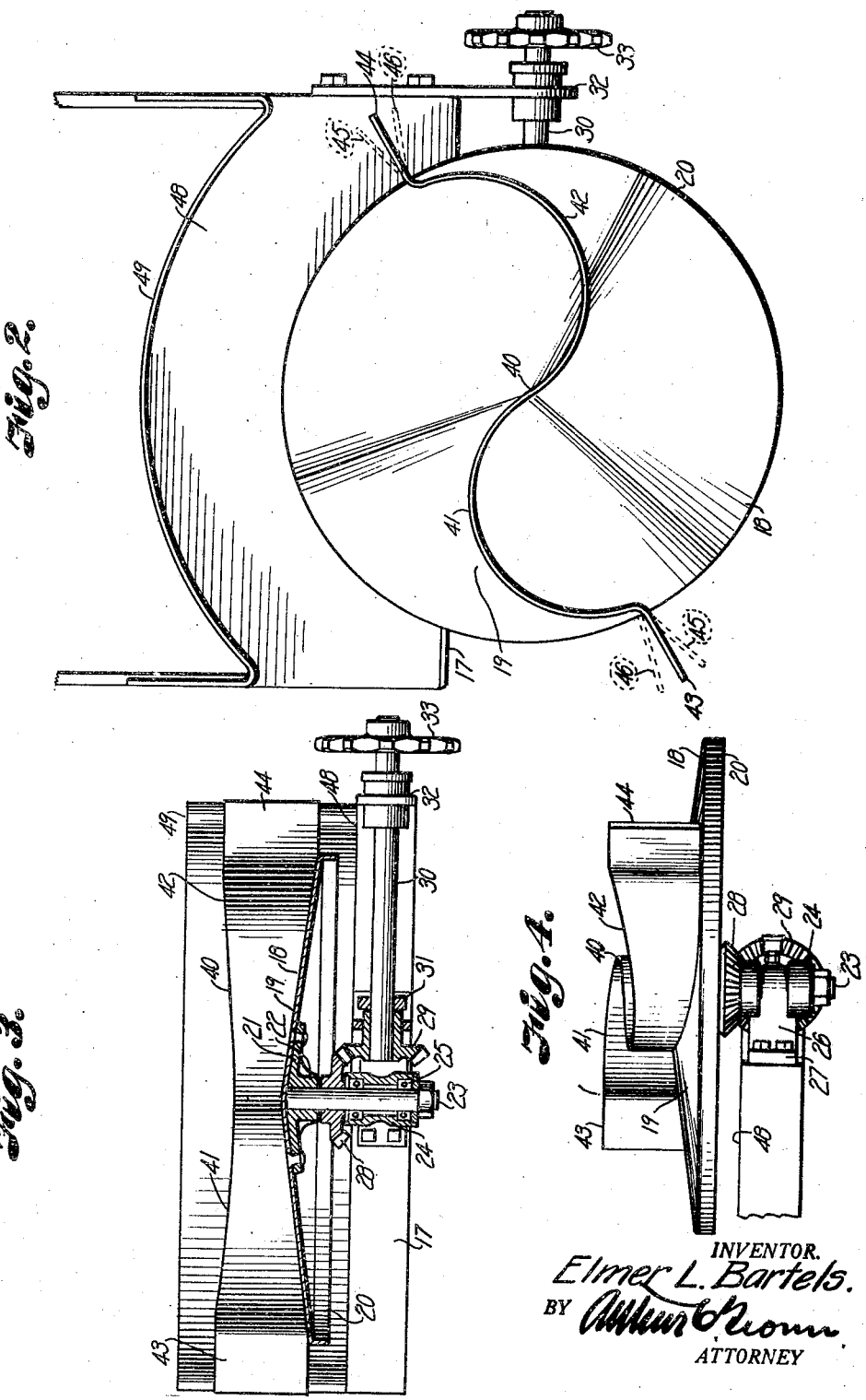

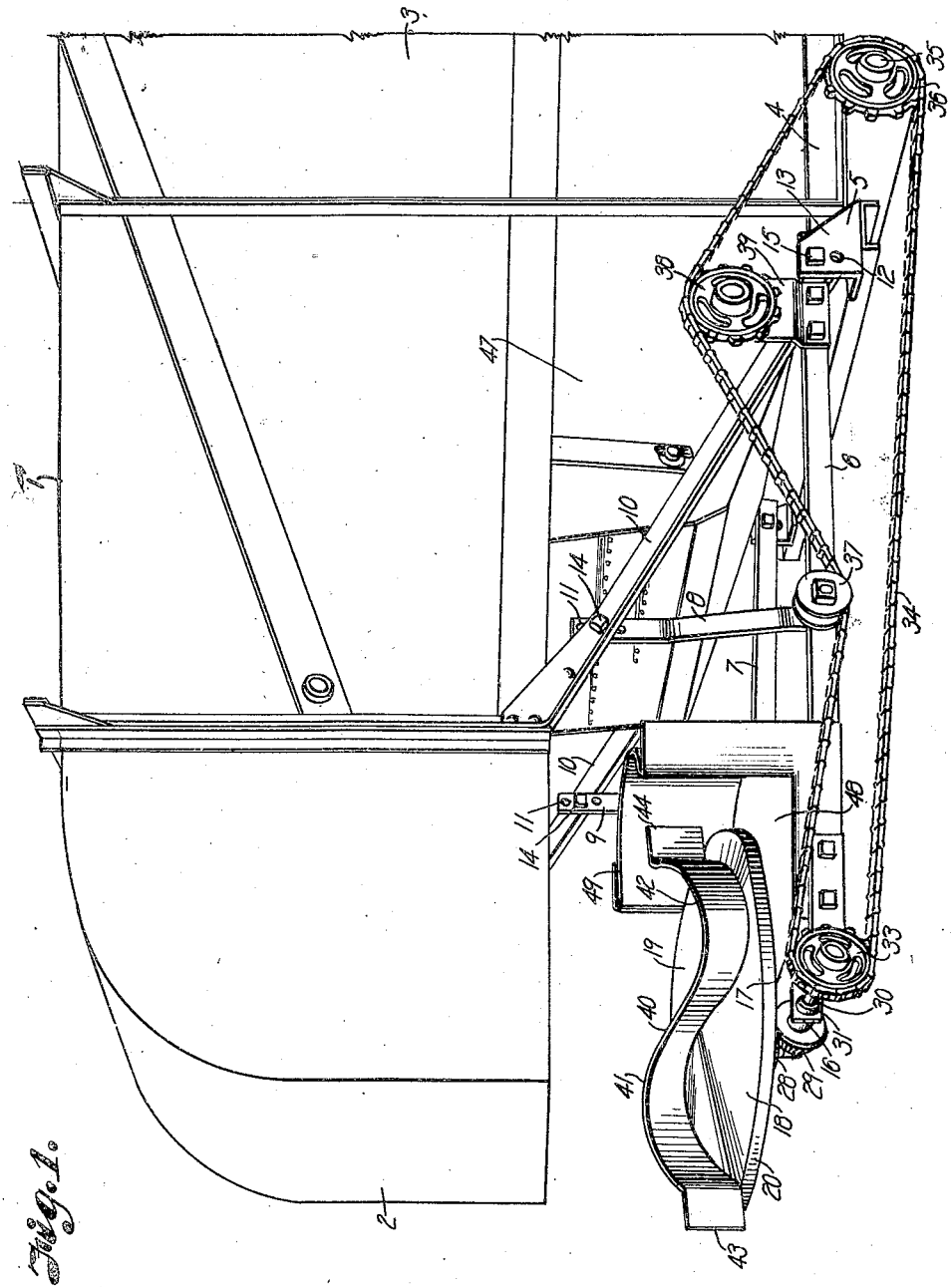

Patented July 21, 1931

1,815,042

UNITED STATES PATENT OFFICE

ELMER L. BARTELS, OF INDEPENDENCE, MISSOURI, ASSIGNOR TO GLEANER COMBINE HARVESTER CORPORATION, OF INDEPENDENCE, MISSOURI, A CORPORATION OF DELAWARE

STRAW SPREADER

Application filed November 24, 1928. Serial No. 321,592.

My invention relates to straw spreaders and more particularly to apparatus of that character for scattering straw discharged from combine harvesting machines, the principal object of the invention being to scatter the straw released from the harvester evenly over the ground for the full width of the swath cut by the machine so that the straw will not interfere with future tillage of the soil.
In accomplishing this and other objects of the invention, I have provided improved details of structure, the preferred forms of which are illustrated in the accompanying drawings, wherein:
Fig. 1 is a perspective view of the rear portion of a combine harvester equipped with a straw spreader constructed according to my invention.

Fig. 2 is a plan view of the straw spreader.
Fig. 3 is a vertical sectional view through the spreading disk and its driving gears, and Fig. 4 is a side view of the spreading disk.
Referring more in detail to the drawings:

1 designates a combine harvesting machine of ordinary type having a hood 2 through which straw is discharged from the separator 3 onto the ground.
Attached to the frame work 4 of the combine at each side of the separator are angular brackets 5 for mounting the forward ends of a pair of arms 6 and 7 providing a subframe for supporting the spreading mechanism as later described. The arms 6 and 7 extend rearwardly along the sides of the separator to a point substantially midway of the discharge hood and are supported in horizontal alignment with the separator by hanger bars 8 and 9 depending from braces 10 which form a part of the separator frame work 4.

In order to adjust the elevation of the separator mechanism with the ground the arms are vertically adjustable on the frame work, a plurality of bolt holes 11 and 12 being provided in the upper ends of the hanger bars and in the vertical plates 13

of the brackets 5 so that bolts 14 connecting the hanger bars with the frame work and bolts 15 connecting the rear ends of the arms with the brackets may be positioned in any one of the holes 11 and 12 to properly position the elevation of the spreading mechanism now described.

Connected with the free ends 16 of the arms 6 and 7 is a cross bar 17 for supporting a rotary straw spreading disk 18 comprising a slightly cone shaped plate 19 of a diameter slightly smaller than the width of the discharge hood. The disk is provided with a depending peripheral rim 20 to stiffen the outer portion of the disk and riveted concentrically with the disk on its under face is a plate 21 having a depending hub 22 for mounting the disk on a vertical shaft 23.

The shaft 23 is rotatably mounted on the cross bar in a bearing 24 on anti-friction bearings 25, the bearing 24 being supported on an arm 26 cast integrally therewith and provided with flanges 27 for securing the bearing to the cross bar.

Fixed to the shaft between the bearing and the hub 22 is a bevel gear 28 for rotating the distributor disk, the gear being driven by a bevel gear 29 meshing therewith and mounted on the free end of a counter shaft 30.

The shaft 30 is rotatably mounted in bearings 31 and 32 bolted to the cross bar 17 and is provided on its outer end with a sprocket wheel 33.

The sprocket wheel 33 may be driven by a chain 34 from any suitable driving shaft on the machine, such as the tailings conveyor shaft 35, a sprocket 36 being fixed to the shaft for operating the chain belt 34.

In order to support and properly tension the upper run of the belt the arm 6 is provided with a flanged roller 37 adjacent the hanger bar 8, and a sprocket wheel 38 is supported on a bracket plate 39 bolted to the arm so that the chain is supported on the sprocket 38 and tensioned by the roller 37.

Fixed on the top face of the spreader disk, preferably by welding, is a reverse curve, sheet metal strip 40 providing paired fins 41 and 42 curved outwardly in the direction of rotation of the disk for feeding the straw toward the periphery thereof, the curved fins gradually increasing in height toward the periphery of the disk and terminating in blades 43 and 44 which catch the straw and propel it outwardly from the disk.

The strip 40 is preferably constructed of relatively tough material so that the blades may be bent to control the radial throw of the straw from the disk, for example to provide a shorter throw of the straw, the blade may be bent backwardly as shown by the dotted lines 45, Fig. 2 so that the straw leaves the blades quickly or the throw may be lengthened by bending the blades forwardly as at 46 to retard discharge of the straw from the blades to receive the full effect of centrifugal force generated by rotation of the disk.

In order to prevent the spreader from discharging the straw against the separator and into the grain shoe 47 thereof, a table 48 is supported by the arms 6 and 7 rearwardly of the disk and provided on its rear edge with an upstanding baffle plate 49 curved on an arc concentric with the disk and spaced therefrom so as to clear the blades 43 and 44.

Thus the straw that would be discharged forwardly of the disk is carried by the blades across the table and discharged at the side thereof.

In using a device constructed as described, the straw is discharged downwardly from the hood and onto the disk where it is picked up by the fins and due to the curved portions, the straw is carried toward the periphery of the disk into position to be discharged by the blades in a thin even layer about the periphery of the disk, the throw of the straw being adjusted as above described to distribute it entirely across the swath cut by the combine.

What I claim and desire to secure by Letters Patent is:

1. A straw spreader including a rotatable platform and fins on the platform having concaved body portions terminating in adjustable flat blade portions extending radially from the periphery of the platform.

2. A straw spreader including a rotatable platform, fins on the platform having interconnected body portions concaved in the direction of rotation of the platform, and having plane flat blades at their outer ends.

3. A straw spreader including a revoluble disk, and a strip of sheet metal set edgewise on the disk, including a central portion extended over the axis of the disk and reversely curved body portions terminating adjacent the periphery of the disk.

4. A straw spreader including a revoluble disk, and a strip of sheet metal set edgewise on the disk, including a central portion extended over the axis of the disk, curved body portions terminating adjacent the periphery of the disk, and rearwardly inclined blades on the outer ends of the body portions.

5. A straw spreader including a revoluble disk, and a strip of sheet metal set edgewise on the disk, including a central portion extended over the axis of the disk, curved body portions terminating adjacent the periphery of the disk, and rearwardly inclined blades on the outer ends of the body portions extended beyond the periphery of the disk.

6. A straw spreader including a revoluble, cone-shaped disk, and a strip of sheet metal set edgewise on the disk, including a radial central portion extended over the apex of the disk, body portions concaved in the direction of rotation of the disk, and blades on the ends of the body portions inclined rearwardly beyond the periphery of the disk.

In testimony whereof I affix my signature.

ELMER L. BARTELS.